Patented July 18, 1939

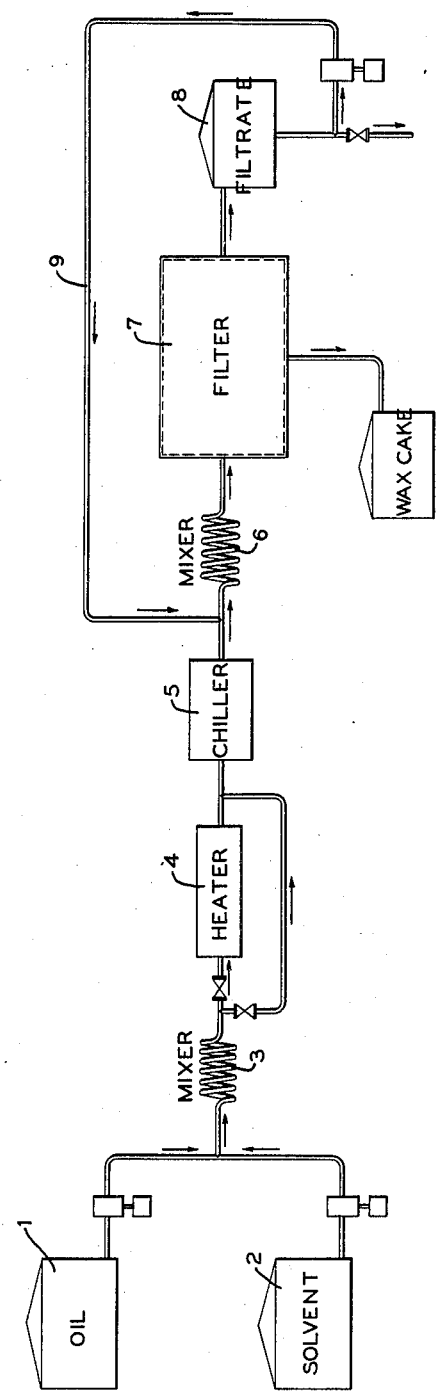

2,166,891

UNITED STATES PATENT OFFICE 2,166,891

DEWAXING HYDROCARBON OIL

William P. Gee, Plainfield, N. J., assignor to The Texas Company, New York, N. Y., a corporation of Delaware Application February 19, 1937, Serial No. 126,566

4 Claims. (Cl. 196—18)

This invention relates to dewaxing hydrocarbon oil for the production of oil having a low pour test.

The invention broadly contemplates a method of dewaxing oil by continuous filtration. It concerns particularly a method of dewaxing waxbearing mineral oil and especially an oil having a large content of wax or containing wax which, upon chilling in the presence of a solvent, is precipitated in a voluminous form.

A type of wax-bearing oil which the method of this invention is particularly adapted to dewax, for example, is a low viscosity wax distillate, such as is derived from Pennsylvania crude, and containing around 18% by volume of paraffin wax. It is characteristic of certain types of oil, and particularly distillate stocks of relatively low viscosity, that the wax constituents are precipitated from them upon chilling in a bulky, voluminous form.

This type of wax precipitate presents some difficulty when dewaxing by filtration, due to the rapidity with which the filter cake is formed. Relatively thick filter cakes are formed in a relatively short time. The nature of the cake is such that it retains substantial amounts of oil which are not removed during the washing step of the filtration cycle. This results in a failure to realize the maximum yield of dewaxed oil.

I have found that this difficulty can be overcome by recycling through the filtering means a portion of the dewaxed filtrate.

Accordingly, my invention comprises mixing the wax-bearing oil with a suitable solvent and chilling the mixture to a temperature at which the wax constituents are precipitated. The resulting chilled mixture containing solidified wax is then introduced to a continuous filter of the rotating drum type wherein the solidified wax constituents are removed in the form of a wax cake with the production of a dewaxed filtrate. A portion of this dewaxed filtrate is returned to the filter inlet where it is re-introduced to the filter in admixture with the fresh incoming wax-bearing oil mixture.

The addition of the dewaxed mixture to the filter charge has the effect of increasing the ratio of oil to wax in the mixture being filtered, so that filtration is accomplished with a slower rate of filter cake formation. A much thinner filter cake is produced so that more effective washing of the filter cake is realized during the washing portion of the filtration cycle. As a result, the resulting yield of dewaxed oil obtained from the charge oil is considerably greater than that realized where the filtration is carried out without the recycling feature. This increase in yield may be as much as 10% or 15% of the charge. At the same time, this greater yield is obtained with a very substantial reduction in the amount of wash solvent necessary in the washing portion of the cycle.

The solvent used in carrying out the process may be either of the selective or of the diluent type. By selective type of solvent, I contemplate a solvent having substantially complete solvent action upon the liquid hydrocarbon constituents of the oil at temperatures of around 0° F. and below, and having substantially no solvent action upon the solid hydrocarbon constituents of the oil at such temperatures. A mixture of an aliphatic ketone, such as acetone or methyl ethyl ketone, and an aromatic hydrocarbon, such as benzol, or a mixture of benzol and toluol, provides a suitable selective solvent.

On the other hand, where a diluent type of solvent is employed, such solvent may, for example, be a petroleum naphtha, natural gasoline, or mixtures of light hydrocarbons, such as derived from natural gasoline.

It is, of course, contemplated that instead of returning a portion of the dewaxed filtrate, as mentioned above, a liquid from some other source may be used, for example, lubricating oil which is substantially free from wax hydrocarbons. In using oil from some other source, it is desirable to adjust the solvent composition of the waxbearing mixture undergoing dewaxing, so that the proper ratio of solvent to oil will be maintained for dewaxing. For this reason, it is preferable to use a portion of the dewaxed filtrate, since it already contains solvent in about the proper proportion. The small increase in the ratio of solvent to oil in the recycled filtrate, due to the wax having been removed therefrom, may be adjusted by slightly decreasing the amount of solvent being mixed with the raw charge.

Where dewaxed filtrate is so used, it is advantageously mixed with the fresh charge at a point between the chiller and the filtering means. The added oil can, of course, be introduced at some preceding point in the dewaxing system.

To further illustrate the operation of my invention, reference will now be made to the accompanying drawing showing a flow diagram of the process.

A Pennsylvania wax distillate having a Saybolt Universal viscosity of about 150 seconds at 100° F. is drawn from a tank 1. A solvent consisting of a mixture of about 40% methyl ethyl ketone and 60% commercial benzol is drawn from a tank 2.

The solvent and oil are forced through a mixer 3 in the ratio of about three parts of solvent mixture to one part of oil. In these proportions, the solvent mixture has substantially complete selective action as between oil and wax at temperatures of around −10° F. or below.

The mixture of wax-bearing oil and solvent may, if desired, be heated to a temperature of around 140° to 180° F. for the purpose of conditioning it prior to chilling. In such case, the mixture of wax-bearing oil and solvent is conducted through a heater 4. Where the heating step is omitted, the mixture by-passes the heater 4 and is introduced directly through a chiller 5.

In the chiller 5, the temperature of the mixture is reduced to about −15° F. At this temperature, it is conducted through the mixing coil 6 wherein it is mixed with the dewaxed filtrate being recycled through the filter 7. From the mixer 6, the mixture is introduced through the filter 7, wherein the solid hydrocarbons are removed as a wax filter cake. The resulting dewaxed filtrate is conducted through the receiving drum 8. A portion of the filtrate collecting in the receiver 8 is then conducted by the pump, as indicated, through pipe 9, by which means it is introduced to the mixer 6, previously referred to.

The remainder of the filtrate accumulating in the receiver 8 is withdrawn and may be conducted to a stripping means for removal of the solvent. Under the conditions stated, and with the type of oil being dewaxed, a pour test of the dewaxed oil of about 0° F. is normally obtained.

The amount of dewaxed filtrate recycled through the filter may comprise around 30% or 35% of the raw charge to the filter. Since it is already at a low temperature, for example, around −13° F., no further cooling is necessary prior to mixing with the fresh wax-bearing mixture. The slight increase in temperature which may arise during passage through the filter can be compensated for by carrying a slightly lower chilling temperature on the mixture leaving the chiller 5. That is, the temperature at this latter point may be maintained at about −18° F.

When operating in the foregoing manner, the yield of dewaxed oil amounts to about 82% by volume of the wax distillate charge, as compared with a yield of about 67%, where the recycling step is omitted. Moreover, the higher yield is obtained when using wash solvent during the washing of the filter cake in the proportion of about 1.7 volumes of solvent to one volume of raw charge. Where the recycling step is omitted, it is necessary to employ a wash ratio of 2.5 volumes of solvent to one volume of raw charge, in order to realize a yield of even 65%.

Where the recycling step is omitted, a relatively thick filter cake is produced, even though the rotational speed of the filtering surface is greatly increased. Neither reducing or increasing the degree of submergence of the filtering surface in the chilled filtering mixture, nor increasing the pressure differential between surface and filter cake, results in any substantial decrease in cake thickness. However, by recycling a portion of the dewaxed filtrate, as above described, the resulting filter cake is much thinner and is more adapted to washing with wash solvent. As a result, retained or adhering oil is much more fully removed from the filter cake with a consequent substantial improvement in the yield of wax-free oil obtained from the original oil.

The beneficial effect of recycling the filtrate is shown in the following example taken from actual commercial operations in dewaxing a Pennsylvania wax distillate having a viscosity of around 90 to 100 Saybolt Universal seconds at 100° F. This particular stock contained a small proportion, about 5 to 10% by volume, of a slop wax cut from the same crude source and having a viscosity of around 50 to 65 seconds at 210° F.

The solvent composition and ratio of solvent mixture to oil was similar to that mentioned above in describing the flow diagram.

The mixture of solvent and wax distillate was chilled to a temperature of about −15 to −16° F. and filtered, producing a dewaxed oil having a pour test of about 0° F.

When filtering in the conventional manner and without recycling of any filtrate, the yield of zero pour test oil obtained amounted to only 50.5% by volume of the charge oil. The wax cake as discharged from the filter, which was of the continuous rotary drum type, was around one inch or more in thickness and consequently retained a large proportion of oil, even though it had been subjected to washing with fresh solvent in the proportion of about two parts solvent by volume to one part of raw charge.

On the other hand, by recycling 1.5 volumes of dewaxed filtrate to one volume of charge oil, the yield was increased to 72.8% of zero pour test oil. By recycling, the filter cake was reduced to about three-sixteenths of an inch in thickness as discharged from the filter.

While the thickness of the filter cake was thus reduced by more than 75%, there was only a very small decrease in the net filtration rate. The net rate without recycling was about 1.53 gallons of dewaxed oil per square foot of filtering surface per hour, while during recycling the net rate was about 1.44, the gross rate being about 1.67, by taking into consideration the volume of filtrate actually being recycled.

While specific examples have been described above in which certain yields of oil have been obtained, it is recognized that the yield of oil obtained is dependent upon the nature and source of the wax-bearing oil undergoing treatment. For example, the wax-bearing oil for which this invention is particularly adapted may contain from 15% to 30% of wax by volume of the oil, and the resulting yield of dewaxed low-pour-test oil may range from 70% to 85% by volume.

While a distillate from Pennsylvania crude has been referred to above, I desire to point out that clean distillates from other sources which are substantially free from naturally-occurring wax crystal modifying substances, and from which the wax is precipitated in a bulky voluminous form may be dewaxed by the method of my invention. Examples of such distillates are those which are derived from such crudes as East Texas, Rodessa, paraffinous Venezuelan, etc.

Obviously, many modifications and variations of the invention, as hereinbefore set forth, may be made without departing from the spirit and scope thereof, and therefore only such limitations should be imposed as are indicated in the appended claims.

I claim:

1. In the art of dewaxing oils in which wax is removed by filtration, the steps comprising mixing a dewaxing solvent with a wax-bearing oil, which mixture upon chilling and filtering tends to deposit a voluminous wax cake difficult to wash and to free from occluded oil, chilling the mixture to precipitate the wax, passing the chilled mixture to a filter to form a wax cake and to produce a filtrate, and mixing a predetermined portion of said cold filtrate with the mixture passing to the filter in such amount as to materially increase the ratio of oil to wax over that of the wax-bearing oil charge to control the character and thickness of said wax cake whereby the same may be washed in situ to remove occluded oil to effect a high total yield of dewaxed oil.

2. The method according to claim 1 in which the wax-bearing oil is mixed with a selective solvent having substantially complete solvent action on the liquid hydrocarbon constituents and substantially no solvent action on the solid hydrocarbons at temperatures of 0° F. and below.

3. In the art of dewaxing oils in which wax is removed by filtration, the steps comprising mixing a dewaxing solvent with a wax-bearing oil, which mixture upon chilling and filtering tends to deposit a voluminous wax cake difficult to wash and to free from occluded oil, chilling the mixture to precipitate the wax, passing the chilled mixture to a continuous rotary filter to deposit a wax cake thereon and to produce a filtrate, and mixing a predetermined portion of said cold filtrate with the mixture passing to the filter in such amount as to materially increase the ratio of oil to wax over that of the wax-bearing oil charge to control the character and thickness of said wax cake whereby the same may be washed in situ to remove occluded oil to effect a high total yield of dewaxed oil.

4. In the art of dewaxing oils in which wax is removed by filtration, the steps comprising mixing a dewaxing solvent with a wax-bearing oil, which mixture upon chilling and filtering tends to deposit a voluminous wax cake difficult to wash and to free from occluded oil, chilling the mixture to precipitate the wax, passing the chilled mixture to a filter to deposit a wax cake and to produce a filtrate, and mixing with the mixture passing to the filter a predetermined portion of dewaxed oil in such amount as to materially increase the ratio of oil to wax over that of the wax-bearing oil charge and of substantially the same grade as that contained in the charge to control the character and thickness of said wax cake whereby the same may be washed in situ to remove occluded oil to effect a high total yield of dewaxed oil.

WILLIAM P. GEE.